Feb. 23, 1954  R. TARDY  2,669,903
SPECTACLES
Filed Dec. 20, 1951
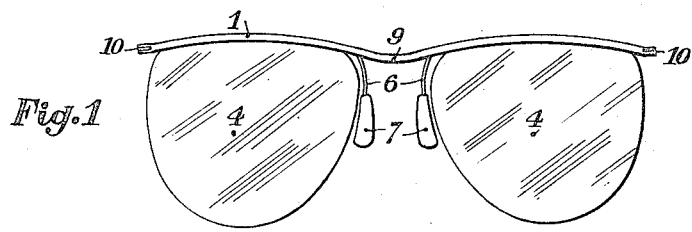
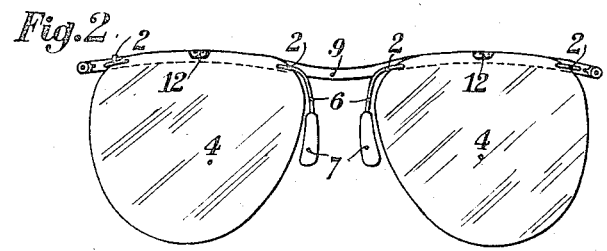
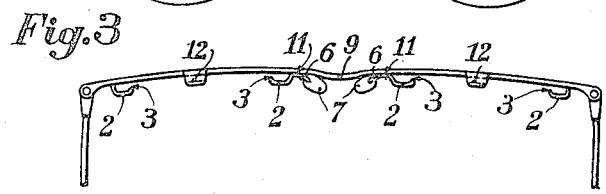
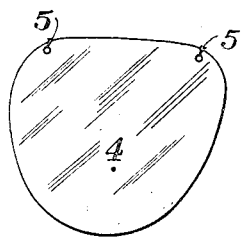
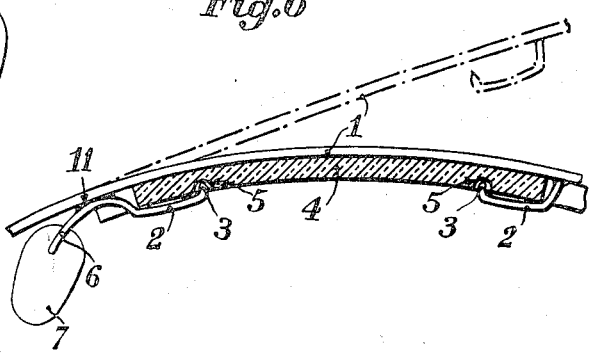
INVENTOR
RENÉ TARDY
By Robert E. Burns
ATTORNEY Patented Feb. 23, 1954

2,669,903

UNITED STATES PATENT OFFICE 2,669,903

SPECTACLES

René Tardy, Rouen, France

Application December 20, 1951, Serial No. 262,523
Claims priority, application France
December 29, 1950

2 Claims. (Cl. 88—47)

This invention relates in general to spectacles and more particularly to an improved ophthalmic spectacle-frame wherein the lenses are mounted in a safe and interchangeable manner without resorting to welding or screw means.

The spectacle frame according to this invention consists of a bar member of more or less resilient metal having a central bridge portion, side-fixing means at either end, and on either side of the bridge portion a pair of convergent clamps, each clamp terminating at its free end with an in-turned bent portion forming a catch directed at right angles to the inner face of the corresponding lens. Preferably, the clamps on the bridge side may be formed with extensions carrying the nose-engaging plates.

The upper portions of the inner faces of the spectacle lenses are formed with shallow cavities registering with, and adapted to be resiliently engaged by, the aforesaid catches by flexibly bending the bar and/or the clamps thereof.

Experience proves that this assembly is extremely safe and simple, due to the elimination of welding and screws. Besides, the lenses may be changed without difficulty and the cavities formed therein are shallow enough to prevent them from constituting incipient fractures or from impairing the strength of the lenses.

The accompanying drawing illustrates diagrammatically by way of example a practical embodiment of the invention.

Fig. 1 is a front view,

Fig. 2 a view from the rear, and

Fig. 3 a plane view of the spectacle-frame according to the invention.

Fig. 4 is a plane view showing the inner face of a lens, and

Fig. 5 is a sectional view of same.

Fig. 6 is a plane and part-sectional fragmentary view of a spectacle-frame according to this invention, illustrating the manner in which the lenses are mounted therein.

The spectacle-frame illustrated in the drawing comprises a bar member 1 of more or less resilient metal, corresponding in shape to the eyebrows, and formed at the inside and for each lens 4 on either side of the bridge portion 9 with a pair of convergent clamps 2 parallel to the longitudinal axis of the bar member 1 and terminating each with an in-turned catch-forming bent portion 3 directed at right angles to a plane tangent with the registering point of the lens; the clamps adjacent to the bridge portion 9 are formed beyond their welded fixation 11 with extensions acting as supporting lugs for the corresponding nose-piece 7 of the spectacle-frame; the bar member 1 is formed at either ends with the conventional hinge or other means for attaching the spectacle sides thereto.

On the inner face of each lens 4 and adjacent to the upper edge thereof are formed a pair of shallow cavities 5, thereby avoiding the drilling of holes and the inconveniences which are their corollary. Due to the flexibility of the bar member 1 and clamps 2, the catches 3 engage these cavities 5 in succession and as a result the lenses are held either elastically or by the interlocking relationship between the bar member 1 and catches 3.

A small lug 12 fast with the bar member 1 may be turned down over the lens edge after mounting the spectacles.

Fig. 6 illustrates in chain-dotted lines the bar member 1 with the inner catch engaged in the corresponding cavity of the lens and in thick lines the same bar member 1 but with the side catch engaged in the outer cavity of the lens; obviously, this operation is permitted by the flexibility of the bar member and clamps.

It appears clearly that with the lenses in position and the catches 3 engaged in the respective cavities 5 thereof the clamps 2 are completely invisible when the spectacles are seen from the front. Moreover, with this spectacle mounting not only is the fitting and removal of mineral lenses extremely rapid and safe but the strength of the resulting assembly is considerable.

With the spectacle-frame mounting according to this invention the essential problem of fixing mineral or plastic lenses to a simple bar member in a direct, quick manner excluding any risk of breaking the lenses and without any visible fixation means is thoroughly solved. Of course, this fixation may also apply to rimmed spectacles provided with lens-receiving bezels, in which case the catches may engage the rims proper.

While I have described hereabove and shown in the accompanying drawing what may be considered as a preferred embodiment of my invention, I wish not to be construed as limiting the invention to the specific shapes and proportions thereof since many modifications may be brought thereto without departing from the spirit and scope of the invention.

What I claim is:

1. In an ophthalmic mounting, a continuous flat bar having a central portion curved to form a nose bridge and end portions receiving temples, lenses having the outer surfaces of upper marginal portions lying against the inner surface of portions of said bar between said nose bridge and temples, each of said lenses having on its inner face recesses in the vicinity of said nose bridge and temples, said recesses being spaced from the edge of the lens and in the marginal portion the outer surface of which engages said bar, and means for holding said lenses comprising a pair of resilient metal wire fingers each affixed at one end on the inner face of, and at right angles to, said bar, then bent at right angles toward each other to provide portions substantially parallel to said bar and then again bent at right angles to provide end portions directed toward said bars, said end portions of the fingers engaging the bottoms of said recesses in said lenses.

2. In an ophthalmic mounting, a single continuous flat bar having a central portion curved to form a nose bridge and end portions receiving temples, lenses having the outer surfaces of upper marginal portions lying against the inner surface of portions of said bar between said nose bridge and temples, each of said lenses having on its inner face recesses in the vicinity of said nose bridge and temples, said recesses being spaced from the edge of the lens and in the marginal portion the outer surface of which engages said bar, and means for holding said lenses comprising a pair of resilient metal wire fingers each affixed at one end on the inner face of, and at right angles to, said bar, then bent at right angles toward each other to provide portions substantially parallel to said bar and then again bent at right angles to provide end portions directed toward said bars, said end portions of the fingers engaging the bottoms of said recesses in said lenses and being of smaller diameter than said recesses.

RENÉ TARDY.

References Cited in the file of this patent
UNITED STATES PATENTS

| Number | Name | Date |
|---|---|---|
| 1,654,054 | Sangren | Dec. 27, 1927 |
| 2,240,725 | Styll | May 6, 1941 |
| 2,244,926 | Uhlemann | June 10, 1941 |
| 2,362,725 | Slotsky | Nov. 14, 1944 |
| 2,373,862 | Vine | Apr. 17, 1945 |
| 2,383,572 | Splaine et al. | Aug. 28, 1945 |
| 2,456,293 | Markell | Dec. 14, 1948 |